(12) United States Patent
Majors et al.

(10) Patent No.: US 8,922,560 B2
(45) Date of Patent: Dec. 30, 2014

(54) METHOD AND APPARATUS FOR CORRELATING SIMULATION MODELS WITH PHYSICAL DEVICES BASED ON CORRELATION METRICS

(75) Inventors: Joshua Le'Roy Majors, Colorado Springs, CO (US); Jeffrey Victor Kouri, Colorado Springs, CO (US)

(73) Assignee: Exelis Inc., McLean, VA (US)

( * ) Notice: Subject to any disclaimer, the term of this patent is extended or adjusted under 35 U.S.C. 154(b) by 305 days.

(21) Appl. No.: 12/826,745

(22) Filed: Jun. 30, 2010

(65) Prior Publication Data

US 2012/0001916 A1 Jan. 5, 2012

(51) Int. Cl.
*G06T 11/20* (2006.01)
*G06F 17/50* (2006.01)

(52) U.S. Cl.
CPC ........ *G06F 17/5009* (2013.01); *G06F 2217/16* (2013.01)
USPC ................... 345/440; 703/11; 705/11; 707/3; 73/866.3

(58) Field of Classification Search
None
See application file for complete search history.

(56) References Cited

U.S. PATENT DOCUMENTS

| | | | |
|---|---|---|---|
| 7,315,798 B2 | 1/2008 | Goto et al. | |
| 2003/0061226 A1* | 3/2003 | Bowman et al. | 707/100 |
| 2003/0153059 A1* | 8/2003 | Pilkington et al. | 435/161 |
| 2003/0172717 A1* | 9/2003 | Kita et al. | 73/23.34 |
| 2004/0122534 A1* | 6/2004 | Paulin | 700/30 |
| 2004/0144168 A1* | 7/2004 | Oku | 73/146 |
| 2005/0093866 A1* | 5/2005 | Ebert | 345/440 |
| 2005/0178185 A1* | 8/2005 | Negri | 73/23.34 |
| 2007/0118347 A1* | 5/2007 | Kouchi et al. | 703/11 |
| 2007/0238094 A1* | 10/2007 | Chaussabel et al. | 435/5 |
| 2008/0215543 A1* | 9/2008 | Huang et al. | 707/3 |
| 2009/0089234 A1* | 4/2009 | Sturrock et al. | 706/45 |
| 2009/0099907 A1* | 4/2009 | Wall | 705/11 |
| 2010/0030527 A1* | 2/2010 | Prasad et al. | 703/1 |

FOREIGN PATENT DOCUMENTS

| | | |
|---|---|---|
| JP | 08314526 | 11/1996 |
| JP | 2004013295 | 1/2004 |
| JP | 2006350586 | 12/2006 |
| JP | 2007136009 | 6/2007 |

OTHER PUBLICATIONS

Weighted Correlation Matrix, Pozzi, 2008, p. 1.*

(Continued)

*Primary Examiner* — David Zarka
*Assistant Examiner* — Phong Nguyen
(74) *Attorney, Agent, or Firm* — Edell, Shapiro & Finnan, LLC

(57) ABSTRACT

A method, program product, and apparatus are provided to correlate operation of a first system and a second system. A first set of metrics are generated for a first set of data produced during operation of the first system. A second set of metrics are generated that correspond to each of metrics in the first set of metrics from a second set of data produced during operation of the second system. A correlation score is computed for the first and second systems based on differences between the first set of metrics and the second set of metrics. The first set of metrics, the second set of metrics, and the correlation score are presented on the display to indicate a similarity of operation of the first and second systems.

30 Claims, 11 Drawing Sheets

(56) References Cited

OTHER PUBLICATIONS

Scott W. Doebling and Francois M. Hemez, "Validating of Structural Dynamics Models at Los Alamos National Laboratory", 41st AIAA/ASME/ASCE/AHS/ASC Structures, Structural Dynamics and Materials Conference, Apr. 3-6, 2000, Atlanta, Georgia.

F. Darvas, D. Pantazis, E. Kucutalun-Yildirim, and R.M. Leahy, "Mapping human brain function with MEG and EEG: methods and validation", Available online at www.elsevier.com/locate/ynimg, Sep. 25, 2004.

Costin Untaroiu, Jae Young Lim, Jaeho Shin, and Jeff Crandall (Center of Applied Biomechanics, University of Virginia, United States), Daniel P. Malone and Rabih E. Tannous (AASA Inc. United States), "Evaluation of a Finite Element Model of the Thor-NT Dummy in Frontal Crash Enviroment", Paper No. 09-0272.

Craig F. Chang (AlliedSignal Aircraft Landing Systems), Warren C. Gibson and Joseph R. Maly (CSA Engineering Inc.), "Experimental Model and Finite Element Analyses, Model Correlation, and Model Tuning for Aircraft Brake Component", pp. 393-399.

Scott W. Doebling and Francois M. Hemez, "Finite Element Model Validation, Updating, and Uncertainty Quantification", Los Alamos Dynamics Structural Dynamics Consultants, Jan. 2002.

Scott W. Doebling, Amanda C. Wilson, and Francois M. Hemez "Design of Computer Experiments for Improving an Impact Test Simulation", Manuscript for Publication at the 19th International Modal Analysis Conference(IMAC), Feb. 5-8, 2001, Kissimmee, Florida.

L. Zhang, R. Sitaraman, V. Patwardhan, L. Nguyen, and N. Kelkar (National Semiconductor Corporation), "Solder Joint Reliability Model with Modified Darveaux's Equations for the micro SMD Wafer Level-Chip Scale Package Family", pp. 573 to 577.

C A Plaxico, G S Patzner, and M H Ray, "Finite Element Modeling of Guardrail Timber Posts and The Post-Soil Interaction", pp. 1-24.

Japanese Official Action with translation dated Jun. 6, 2013, 4 pages.

Extended European Search Report dated Sep. 6, 2013, 7 pages.

Mongiardini et al., "Development of a Software for the Comparison of Curves During the Verification and Validation of Numerical Models", XP-002711682, 7th European LS-DYNA Conference, Copyright 2009, DYNAmore GmbH, 12 pages.

\* cited by examiner

ACCELERATION EXAMPLE

METHOD AND APPARATUS FOR CORRELATING SIMULATION MODELS WITH PHYSICAL DEVICES BASED ON CORRELATION METRICS

STATEMENT REGARDING FEDERALLY SPONSORED RESEARCH OR DEVELOPMENT

The U.S. Government may have a paid-up license in this invention and the right in limited circumstances to require the patent owner to license others on reasonable terms as provided by the terms of Contract No. N00178-04-D-4123-AE&S-EK01 awarded by The Department of the Navy (Strategic Systems Programs).

BACKGROUND

1. Technical Field

The present invention embodiments pertain to data correlation. In particular, the present invention embodiments pertain to correlating a simulation model with a physical device based on correlation metrics and plotting the metrics to indicate variance between the simulation model and device.

2. Discussion of Related Art

Numerical analysis is widely used to find approximate solutions for problems lacking exact solutions. In mathematics, these problems can range from approximating the values of roots, e.g., square roots, and the value of $\pi$, to evaluating integrals and differential equations. The mathematical problems may represent many real-world problems for which numerical analysis can provide solutions (e.g., weather prediction, scheduling and pricing algorithms, crash simulation, explosion modeling, etc.).

Numerical analysis has been used to approximate solutions by using interpolation and extrapolation. Many techniques have been developed to provide approximations to various problems of interest. Initially, various functions and their approximations at certain points, computed to various degrees of precision, were available in reference books. With the advent of modern computers, many problems can now be modeled. For example, a finite element method is incorporated into software for finite element analysis (FEA) and can provide approximate solutions for complex heat flow problems, magnetic flux calculations, or to model structural failures. Other software applications may solve systems with a large number of equations or Markov chains.

For real-world applications, simulation is highly desirable because of the lower cost or the impracticality of building a prototype. In one example, a simulation is preferred over building a physical device or test case for each test scenario. In other examples, building a test case is impractical due to scaling effects (e.g., it is impractical to build a physical prototype to simulate world weather patterns or to simulate earthquakes).

While simulation of real-world systems can provide more practical and less expensive solutions when compared to actual physical prototypes, the simulation is almost always flawed because assumptions and approximations are introduced into the simulation mathematical model to simplify the processing requirements. In order to compare the simulation with the real-world system, a limited quantity of actual data may be plotted against simulation data to enable visual interpretation of the correlation.

SUMMARY

According to a present invention embodiment, a method, program product, and apparatus are provided to correlate operation of a first system and a second system. Briefly, correlation metrics are generated for a first set of data and a second set of data, a correlation score is computed between the correlation metrics, and a plot of the correlation metrics and correlation score is displayed. The apparatus includes at least an output module and a processor. The output module is coupled to a display to present the plurality of correlation metrics and the correlation score. The processor controls the presentation of the plurality of correlation metrics and the correlation score. The processor includes a correlation module to generate a first set of metrics from the first set of data produced during operation of the first system, generate a second set of metrics that correspond to each of the first set of metrics from the second set of data produced during operation of the second system, and compute a correlation score for the first and second systems based on differences between the first set of metrics and the second set of metrics. The first set of metrics, the second set of metrics, and the correlation score are presented on the display via the output module to indicate the similarity of operation of the first and second systems.

The above and still further features and advantages of the present invention will become apparent upon consideration of the following detailed description of example embodiments thereof, particularly when taken in conjunction with the accompanying drawings wherein like reference numerals in the various figures are utilized to designate like components.

DETAILED DESCRIPTION OF EXAMPLE EMBODIMENTS

In order to determine how well a simulation models a real-world system, model developers have devised various tests or metrics to compare how well a simulation models a real-world system, e.g., simulation data may be compared to actual test data using test statistics or metrics. By way of example, a structure may be fitted with strain gauges and then be subjected to an impulse or force, e.g., a mass is dropped on the structure. The outputs of the test strain gauges are recorded. The structure and strain gauge outputs may be simulated in software using FEA. The simulated strain gauge outputs are then compared to the recorded test strain gauge outputs using a metric, e.g., a root-mean square (RMS) error between the simulation strain gauge outputs and test strain gauge outputs. The lower the RMS error, the better the simulation is said to "fit" the real-world test.

Current methods to compare simulation data with test data may use only a single metric and do not always provide a meaningful way to interpret the simulation results relative to the test results. The continually increasing complexity of computer models leads to increasingly complex analytical predictions that are difficult to correlate with physical test data. As the number of metrics used for comparison increases, the decision process as to whether or not the simulation fits the real-world, becomes more complex.

The present invention embodiments provide a methodology and apparatus that provides a consistent and objective approach to quantitatively correlate test data, simulation results, or test data and simulation results. Also provided is a concise way to display correlation metrics and compute an associated correlation score based on the correlation metrics.

Figure 1:
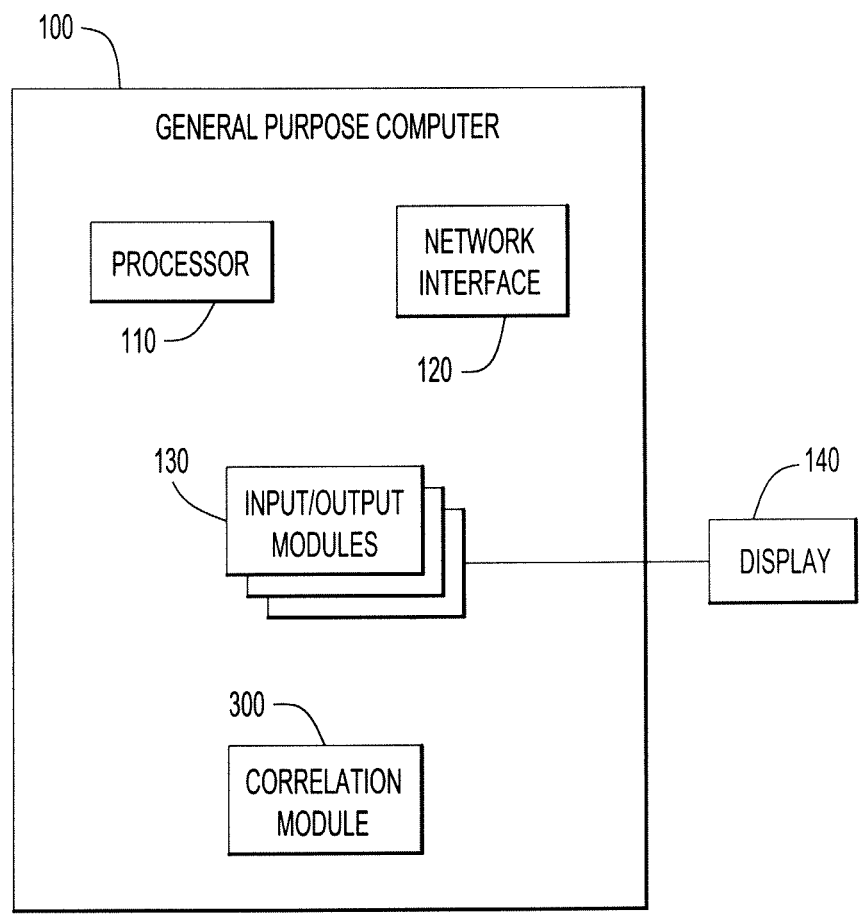
FIG. 1 is a block diagram of an example general purpose computer with a correlation module configured to generate correlation metrics in accordance with an embodiment of the present invention.

An example device configured to generate and display correlation metrics is illustrated in FIG. 1. Specifically, the device comprises a general purpose computer 100 with a processor 110, a network interface 120, a plurality of input/output (IO) modules 130, a display 140, and a correlation module 300. General purpose computer 100 may further include other application specific components (e.g., a sensor interface module or other data gathering devices for the collection of test data). Processor 110 is preferably implemented by a conventional microprocessor or controller and controls the various components and modules in accordance with the techniques described below. Network interface 120 is preferably implemented by a conventional network interface, e.g., a network interface card (NIC), and provides network communications for general purpose computer 100. IO modules 130 are preferably implemented by conventional IO components typically included on a motherboard of general purpose computer 100 and may include IO interfaces for a keyboard, a computer mouse, and a video output for a computer display monitor e.g., for output to display 140.

Generally, correlation module 300 contains the intelligence to generate correlation metrics associated with two or more sets of data and display the metrics to a user according to a present invention embodiment. Module 300 may be in the form of computer instructions that are executed by processor 110 or may be implemented in hardware, e.g., logic built into an application specific integrated circuit (ASIC) or logic programmed into a field programmable gate array (FPGA). Once correlation module 300 generates the various correlation metrics, then correlation module 300 computes a correlation score that indicates the relative closeness or fit between the two or more sets of data. Correlation module 300, by way of processor 110, causes the correlation metrics and correlation score to be presented to the user on display 140 in an easy to understand form.

Figure 2:
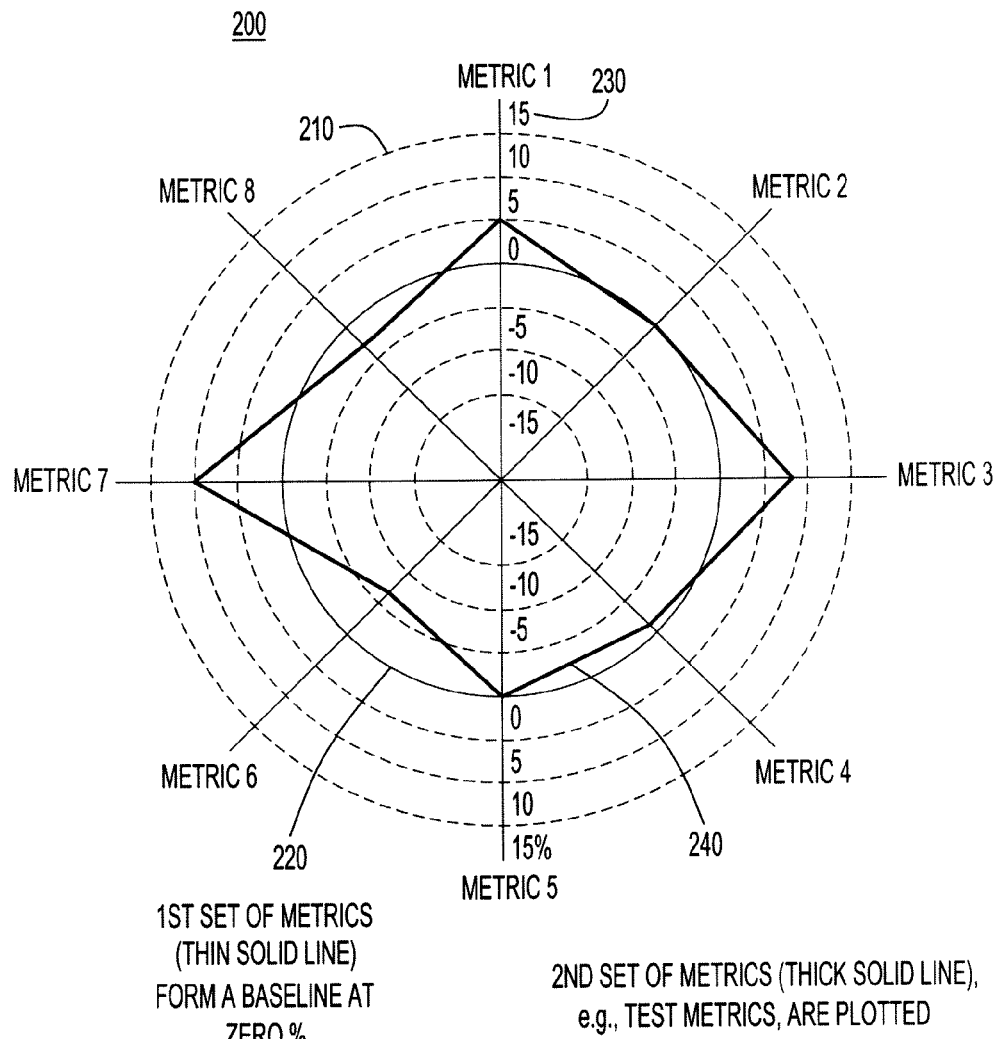
FIG. 2 is a graphical illustration of an example generic radial plot of a plurality of correlation metrics in accordance with an embodiment of the present invention.

An example radial or spider plot 200 of the correlation metrics and score is depicted in FIG. 2. A series of metrics 1-8 are being compared for two sets of data. Spider plot 200 has a series of concentric dashed rings or circles 210, and a solid baseline ring 220. The rings 210 and 220 are labeled with a percentage deviation from baseline 230. The baseline ring 220 represents the first set of metrics, e.g., metrics generated from test data collected for a real-world system. A second set of metrics 240 are plotted as a thick line relative to baseline ring 220. The second set of metrics 240 may be generated from data collected from a simulation of the real-world system. Alternatively, the two sets of data could come from two simulation runs and the simulation metrics are compared to each other or the two sets of data could come from two real-world tests and the test metrics are compared to each other.

General purpose computer 100 preferably employs Graphical User Interface (GUI) functionality to display spider plot 200 with normalized metrics plotted against the baseline. Spider plot 200 depicts the first set of metrics 220 as a baseline of zero percent and the second set of metrics 240 is plotted as a percentage deviation from the baseline metrics 220. Spider plot 200 shows deviations from the baseline ring 220 for the second set of metrics 240 of approximately +5%, 0%, +8%, −1%, 0%, −7%, +10%, and −3% for metrics 1-8, respectively. Metrics with little or no deviation from the baseline, e.g., metrics 2, 4, and 5, correlate closely with the real-world system being modeled. Metrics with a larger deviation, e.g., metrics 3, 6, and 7, do not correlate as closely with the real-world system and indicate areas in which the simulation model may be improved.

If all metrics 1-8 are deemed to be of equal importance, then the absolute values of all the deviations from the baseline could be summed to attain an overall correlation score. Summing the absolute values of the above deviations from the baseline yields a correlation score of 34. If the metrics are not equally important, then weights could be assigned to each metric before computing the correlation score, i.e., a weighted summation or average may be used to compute the correlation score. The correlation score may also be displayed on the display 140.

As can be seen from FIG. 2, a relatively large number of correlation metrics for different sets of data can be displayed relative to one another. Additional axes or spider plots may be used to compare additional metrics. Spider plot 200 is drawn using concentric rings 210 and 220, but could be drawn using concentric polygons, e.g., for eight metrics concentric octagons could be used.

Figure 3:
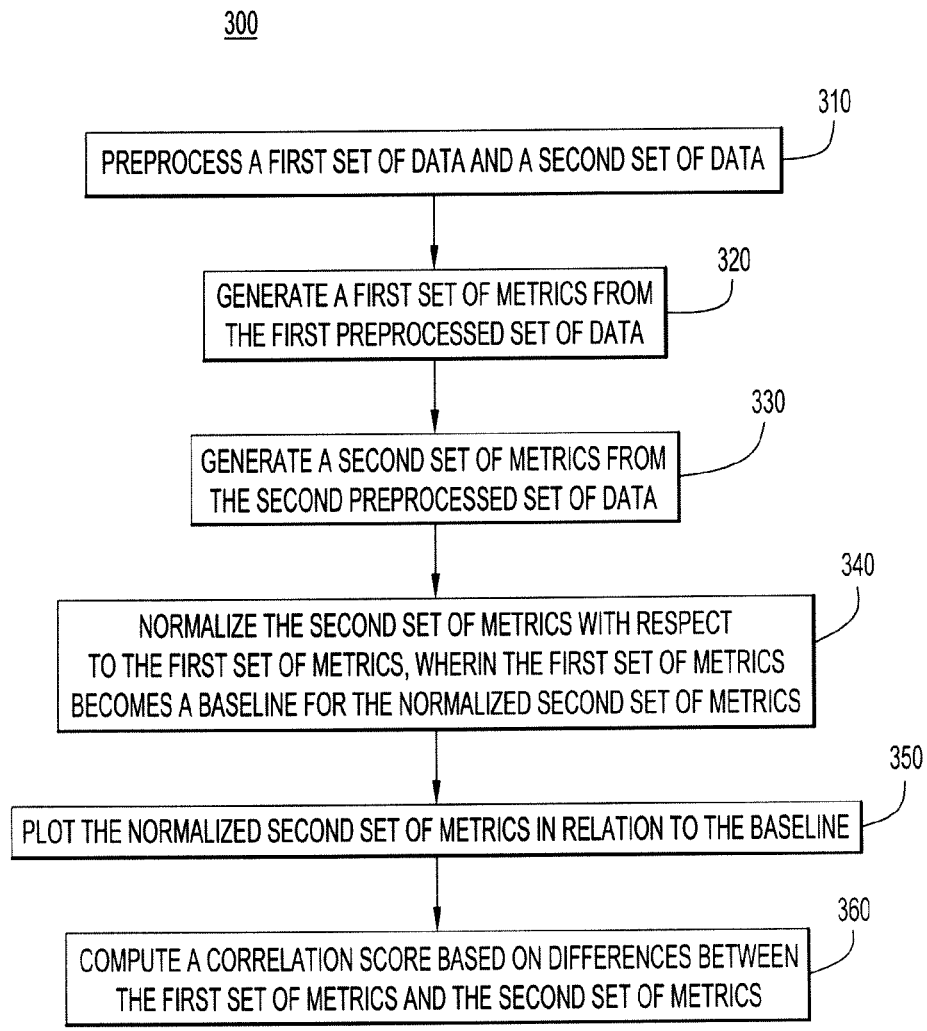
FIG. 3 is a procedural flowchart illustrating the manner in which a general purpose computer generates correlation metrics and computes a correlation score in accordance with an embodiment of the present invention.

A procedural flowchart generally outlining the manner in which correlation module 300 generates correlation metrics and computes a correlation score according to a present invention embodiment is illustrated in FIG. 3. For purposes of describing the flowchart, it is presumed that a first and a second set of data have already been generated or captured, e.g., a set of simulation data and a set of test data. The first and second sets of data may be preprocessed at step 310. In particular, prior to producing the metrics, the test data and simulation data may be subject to preprocessing by an application, whereby the amount of data may be reduced. Prior to evaluating the performance metrics, the application formats the data to ensure consistent calculation of all metrics. The application may provide a user with the ability to convert data between various units using, e.g., a dropdown box. In one example, strain data may be converted to micro-strain based upon the user selection in the dropdown box.

The application may also provide for time alignment of the data sets to ensure a reliable correlation score. The minimum time of all data sets are set to 0.0 seconds. This eliminates test data preceding 0.0 seconds or data that are not pertinent to the test. The application may also set the maximum time for each data set by using the lesser of the two maximum time values from each data file. This will allow the analysis of the maximum amount of data for the calculations.

Figure 4:
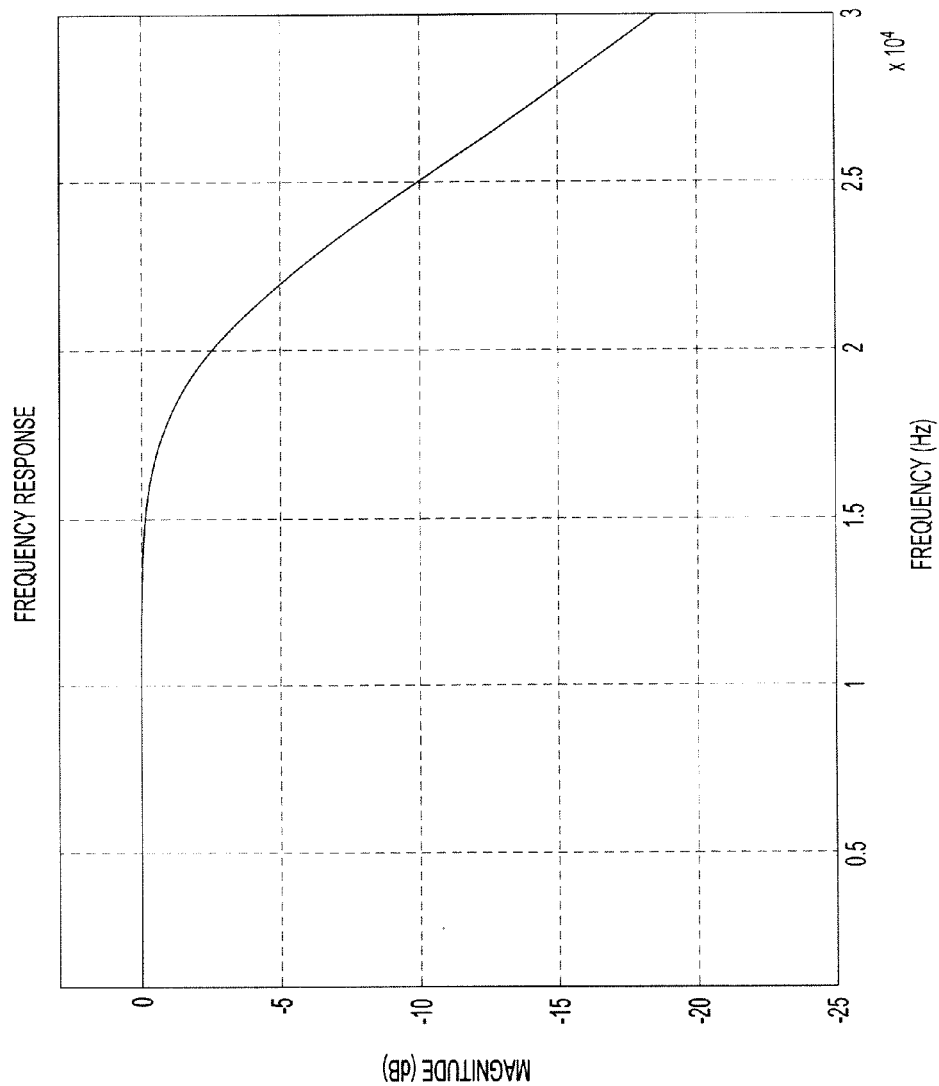
FIG. 4 is a graphical illustration of a response curve for a low pass filter used in connection with generating correlation metrics in accordance with an embodiment of the present invention.

Data for both the simulation and test may be filtered. For the strain gauge model, it is useful to filter the data at 20 kHz using a Butterworth low-pass filter (LPF). Design of the filter may include 3 dB of ripple in the pass-band and 10 decibels (dB) of attenuation in the 5 kHz stop-band. Filter order may be calculated using, for example, the MATLAB function buttord. With the order of the filter defined, together with the pass-band and stop-band definition, the MATLAB function, butter, calculates the filter coefficients. These filter coefficients define the filter and are used by the MATLAB filter command, filtfilt, to filter the data forwards and backwards, mitigating any phase distortion. An example response curve for such a low-pass filter is shown in FIG. 4.

In another example, the application may perform data decimation as the final step in data reduction prior to calculating the metrics. Data may be decimated to 100 kHz, thereby generating congruent sampling rates for the simulation and test data. Identical sampling rates and time duration ensures that any Fast Fourier Transforms (FFTs) of both test and simulation data have equal number and length frequency bands.

Before metrics can be generated for time series data, the start times of each set of data must be aligned to each other. The start times for each set of data may be normalized to a predetermined value, e.g., zero, or the data may be time aligned, one relative to another. Sample rates and periods should also be accounted or otherwise compensated for when generating metrics for correlation with each other. A first set of metrics is generated from a first set of data, e.g., test data, at step 320. A second set of metrics is generated from a second set of data, e.g., simulation data, at step 330. Since the metrics are to be compared, the types of metrics generated from the first and second sets of data are the same.

Figure 5:
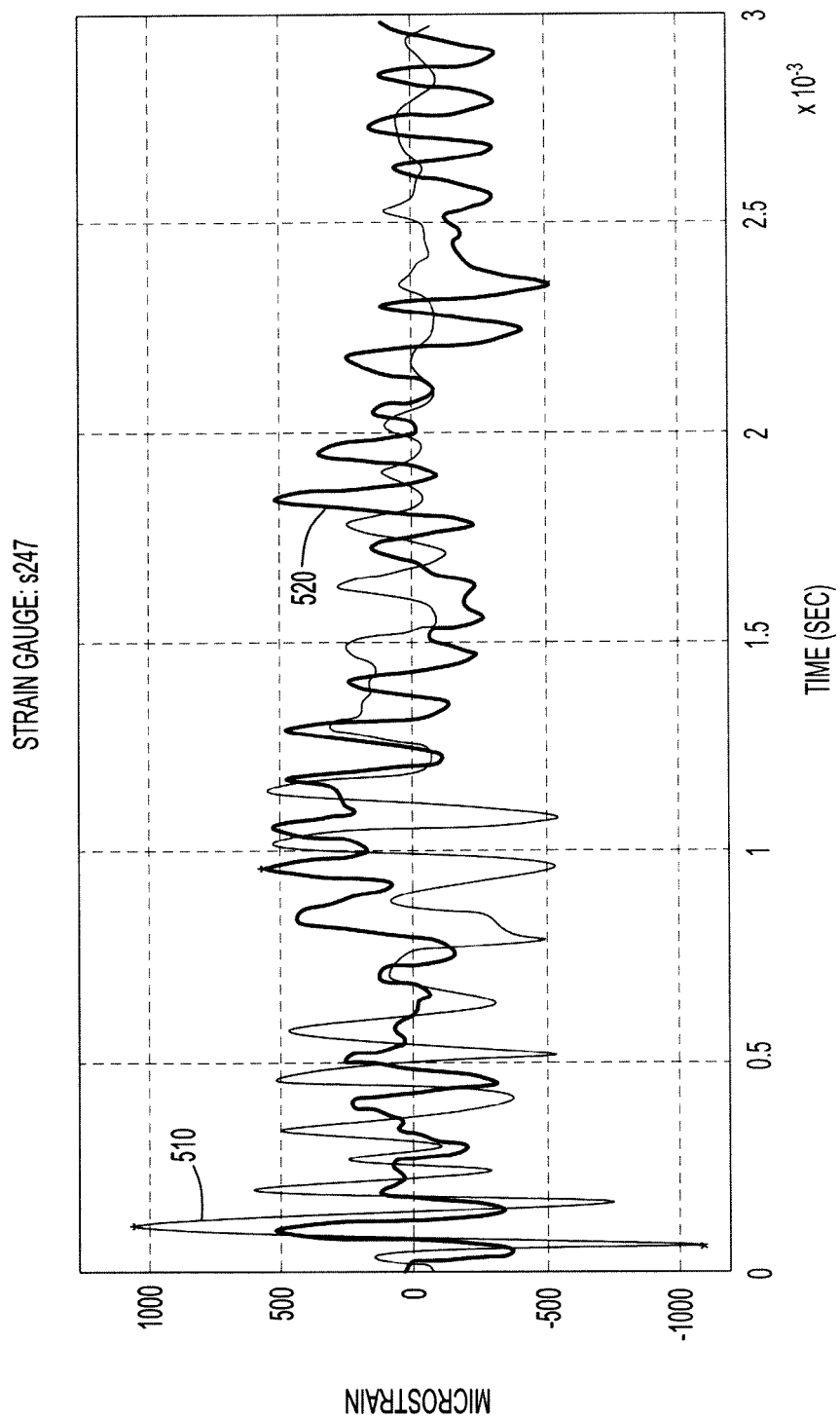
FIG. 5 is a graphical illustration of an example plot of microstrain against time for test data recorded from a strain gauge and simulation data generated from a computer model of the strain gauge.

Two example sets of data for a strain type application that may be used to generate correlation metrics are shown in FIG. 5. Test data 510 and simulation data 520 are plotted as microstrain versus time. Test data 510 was captured from a strain gauge labeled s247 that is coupled to a structure. A force was applied to the structure and the response from strain gauge s247 was recorded. Simulation data 520 were derived from a mathematical model of the structure and strain gauge s247. Simulation data 520 may be generated using commercially available mathematics simulation software, such as MATLAB or Mathematica that runs on a general purpose computer.

Figure 6:
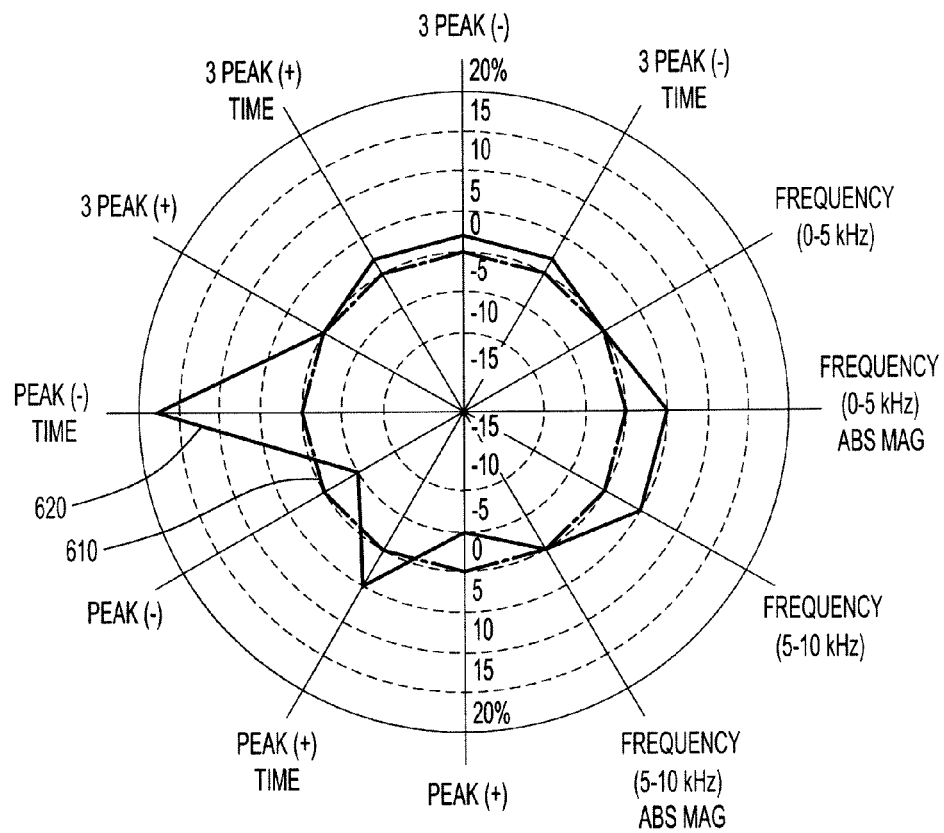
FIG. 6 is a graphical illustration of a radial plot of a plurality of correlation metrics that are generated in accordance with an embodiment of the present invention for the test data and simulation data illustrated in FIG. 4.

Correlation metrics were generated from both sets of data 510 and 520. A spider plot of the correlation metrics generated in year 1 is shown in FIG. 6. The correlation metrics for the test data 510 are plotted as a dodecagon or baseline ring 610. Simulation correlation metrics 620 are plotted relative to the baseline 610. The spider plot provides a convenient way of highlighting highly similar or dissimilar correlation metrics.

Example correlation metrics and corresponding weights are described. By way of example, the metrics include peak to peak, timing, and frequency correlation metrics. However, any suitable metrics and weights may be used.

The Peak (+) Metric is the percent error between the maximum response value of the FEA and the maximum response value of the test data divided by the maximum response value of the test data. For purposes of calculating the correlation score, the Peak (+) Metric is given a weight of 17.5% as shown in Eq. 1.

$$\text{Peak }(+) = (17.5\%) \times \left[\left(\frac{FEA_{max} - Test_{max}}{Test_{max}}\right) \times 100\right] \quad \text{(Eq. 1)}$$

The Peak (+) Time Metric is the percent error between an occurrence time of the maximum response value of the FEA and an occurrence time of the maximum response value of the test data, divided by one millisecond. The one millisecond denominator normalizes the calculation by mitigating the effect of small time denominator at an early time or a large time denominator at a late time that would otherwise be used in the calculation. The Peak (+) Time Metric is given a weight of 7.5% as shown in Eq. 2.

$$\text{Peak }(+) \text{ Time} = (7.5\%) \times \left[\left(\frac{FEA_{max\,time} - Test_{max\,time}}{0.001 \text{ sec}}\right) \times 100\right] \quad \text{(Eq. 2)}$$

The Peak (−) Metric is the percent error between the minimum response value of the FEA and the minimum response value of the test data divided by the minimum response value of the test data. For purposes of calculating the correlation score, the Peak (−) Metric is given a weight of 17.5% as shown in Eq. 3.

$$\text{Peak }(-) = (17.5\%) \times \left[\left(\frac{FEA_{min} - Test_{min}}{Test_{min}}\right) \times 100\right] \quad \text{(Eq. 3)}$$

The Peak (−) Time Metric is the percent error between an occurrence time of the minimum response value of the FEA and an occurrence time of the minimum response value of the test data, divided by one millisecond. The one millisecond denominator normalizes the calculation by mitigating the effect of small time denominator at an early time or a large time denominator at a late time that would otherwise be used in the calculation. The Peak (−) Time Metric is given a weight of 7.5% as shown in Eq. 4.

$$\text{Peak }(-) \text{ Time} = (7.5\%) \times \left[\left(\frac{FEA_{min\,time} - Test_{min\,time}}{0.001 \text{ sec}}\right) \times 100\right] \quad \text{(Eq. 4)}$$

The 3 Peaks (+) Metric is the average absolute difference between the subsequent 3 largest positive response values following the maximum value, divided by the average of the test's subsequent 3 largest positive response values. The 3 Peaks (+) Metric is given a weight of 7.5% as shown in Eq. 5.

$$3 \text{ Peak }(+) = (7.5\%) \times \left[\left(\frac{\text{average}(|FEA_{max\,3} - Test_{max\,3}|)}{\text{average}(|Test_{max\,3}|)}\right) \times 100\right] \quad \text{(Eq. 5)}$$

The 3 Peaks (+) Time Metric is the average absolute difference between the occurrence times of the subsequent 3 largest positive response values following the maximum value, divided by one millisecond. The one millisecond denominator normalizes the calculation by mitigating the effect of small time denominator at an early time or a large time denominator at a late time that would otherwise be used in the calculation. The 3 Peaks (−) Time Metric is given a weight of 2.5% as shown in Eq. 6.

$$3 \text{ Peak (+) Time} = (2.5\%) \times \left[ \left( \frac{\text{average}(|FEA_{max\,3} - Test_{max\,3}|)}{0.001 \text{ sec}} \right) \times 100 \right] \quad (\text{Eq. 6})$$

The 3 Peaks (−) Metric is the average absolute difference between the subsequent 3 most negative response values following the minimum value, divided by the average of the test's subsequent 3 most negative response values. The 3 Peaks (−) Metric is given a weight of 7.5% as shown in Eq. 7.

$$3 \text{ Peak } (-) = (7.5\%) \times \left[ \left( \frac{\text{average}(|FEA_{min\,3} - Test_{min\,3}|)}{\text{average}(|Test_{min\,3}|)} \right) \times 100 \right] \quad (\text{Eq. 7})$$

The 3 Peaks (−) Time Metric is the average absolute difference between the occurrence times of the subsequent 3 most negative response values following the minimum value, divided by one millisecond. The one millisecond denominator normalizes the calculation by mitigating the effect of small time denominator at an early time or a large time denominator at a late time that would otherwise be used in the calculation. The 3 Peaks (−) Time Metric is given a weight of 2.5% as shown in Eq. 8.

$$3 \text{ Peak } (-) \text{ Time} = (2.5\%) \times \left[ \left( \frac{\text{average}(|FEA_{min\,3} - Test_{min\,3}|)}{0.001 \text{ sec}} \right) \times 100 \right] \quad (\text{Eq. 8})$$

The Frequency (0-5 kHz) Metric is the percent error between the dominant frequency components of the FEA output and test output over the 0 to 5 kHz band, and divided by the 5 kHz bandwidth. The 5 kHz denominator normalizes the calculation by mitigating the affect of a small denominator at lower frequencies or a large denominator at higher frequencies that would otherwise be used in the calculation. The Frequency (0-5 kHz) Metric is given a weight of 10.0% as shown in Eq. 9.

$$\text{Frequency (0-5 kHz)} = (10.0\%) \times \left[ \left( \frac{FEA_{(0-5\,KHz)} - Test_{(0-5\,KHz)}}{5 \text{ KHz}} \right) \times 100 \right] \quad (\text{Eq. 9})$$

The Frequency (0-5 kHz) Absolute Magnitude Metric is the percent error between the magnitude of the dominant frequency of the FEA and the magnitude of the dominant frequency of the test data over the 0 to 5 kHz band. The Frequency (0-5 kHz) Absolute Magnitude Metric is given a weight of 5.0% as shown in Eq. 10.

$$\text{Freq (0-5 kHz) Abs. Mag.} = (5.0\%) \times \left[ \left( \frac{FEA_{mag(0-5\,KHz)} - Test_{mag(0-5\,KHz)}}{Test_{mag(0-5\,KHz)}} \right) \times 100 \right] \quad (\text{Eq. 10})$$

The Frequency (5-10 kHz) Metric is the percent error between the dominant frequency components of the FEA output and test output over the 5 to 10 kHz band, and divided by the 5 kHz bandwidth. The 5 kHz denominator normalizes the calculation by mitigating the effect of a small denominator at lower frequencies or a large denominator at higher frequencies that would otherwise be used in the calculation. The Frequency (5-10 kHz) Metric is given a weight of 10.0% as shown in Eq. 11.

$$\text{Frequency (5-10 kHz)} = (10.0\%) \times \left[ \left( \frac{FEA_{(5-10\,KHz)} - Test_{(5-10\,KHz)}}{5 \text{ KHz}} \right) \times 100 \right] \quad (\text{Eq. 11})$$

The Frequency (5-10 kHz) Absolute Magnitude Metric is the percent error between the magnitude of the dominant frequency of the FEA and the magnitude of the dominant frequency of the test data over the 5 to 10 kHz band. The Frequency (5-10 kHz) Absolute Magnitude Metric is given a weight of 5.0% as shown in Eq. 12.

$$\text{Freq (5-10 kHz) Abs. Mag.} = (5.0\%) \times \left[ \left( \frac{FEA_{mag(5-10\,KHz)} - Test_{mag(5-10\,KHz)}}{Test_{mag(5-10\,KHz)}} \right) \times 100 \right] \quad (\text{Eq. 12})$$

Referring back to FIG. 3, the sets of data are normalized relative to each other at step 340. The metrics for one set of data are normalized relative to the other such that one set of metrics forms a baseline. In one example, each of the metrics in the second set of metrics are mathematically divided by corresponding metrics in the first set of metrics, whereby each metric in the first set of metrics become a baseline, e.g., a baseline of zero or one, and each metric in the second set of metrics is normalized thereto. Metrics generated in equations 1-12 are normalized to the test data by dividing the metric by corresponding test data or a neutral parameter, e.g., 0.001 seconds or 5 KHz. Other mathematical operations may be performed on the data sets, e.g., quantization or a Euclidian norm operation.

The normalized metrics are presented, displayed, or otherwise plotted against the baseline at step 350, for example, the second set of metrics 620 as shown in FIG. 6. A correlation score is computed based on differences between the first and second sets of metrics at step 360. The Correlation Score provides the final score, rating the correlation of simulation data with test data. Summing the absolute values of the twelve weighted metric scores described above produces the Correlation Score as shown in Eq. 13. Perfect correlation would result in a Correlation Score of 0.0, while an imperfect correlation score ranges between 0.0 and infinity (an upper bound does not exist). The correlation score for the set of model correlation metrics depicted in FIG. 6 is 60.1001.

$$\text{Correlation Score} = \sum_{n=1}^{12} |WeightedMetric_n| \qquad \text{(Eq. 13)}$$

The metrics used for plotting and computing the correlation score are chosen based upon the real-world system that is being modeled. For example, weighted performance metrics may be chosen and vetted through a peer review process. The metrics may be chosen to correlate system response in both the time and/or frequency domains. The metrics may be weighted based upon their peer reviewed importance or other industry standards. The summation of weighted metrics leads to a correlation score that is a quantitative measure of how well the computational model represents the response of the system based upon the chosen weighting scheme. In addition to correlating current simulation results with test data, the correlation score provides a baseline to compare future results and determine if updates to the computational model have a positive effect.

Figure 7:
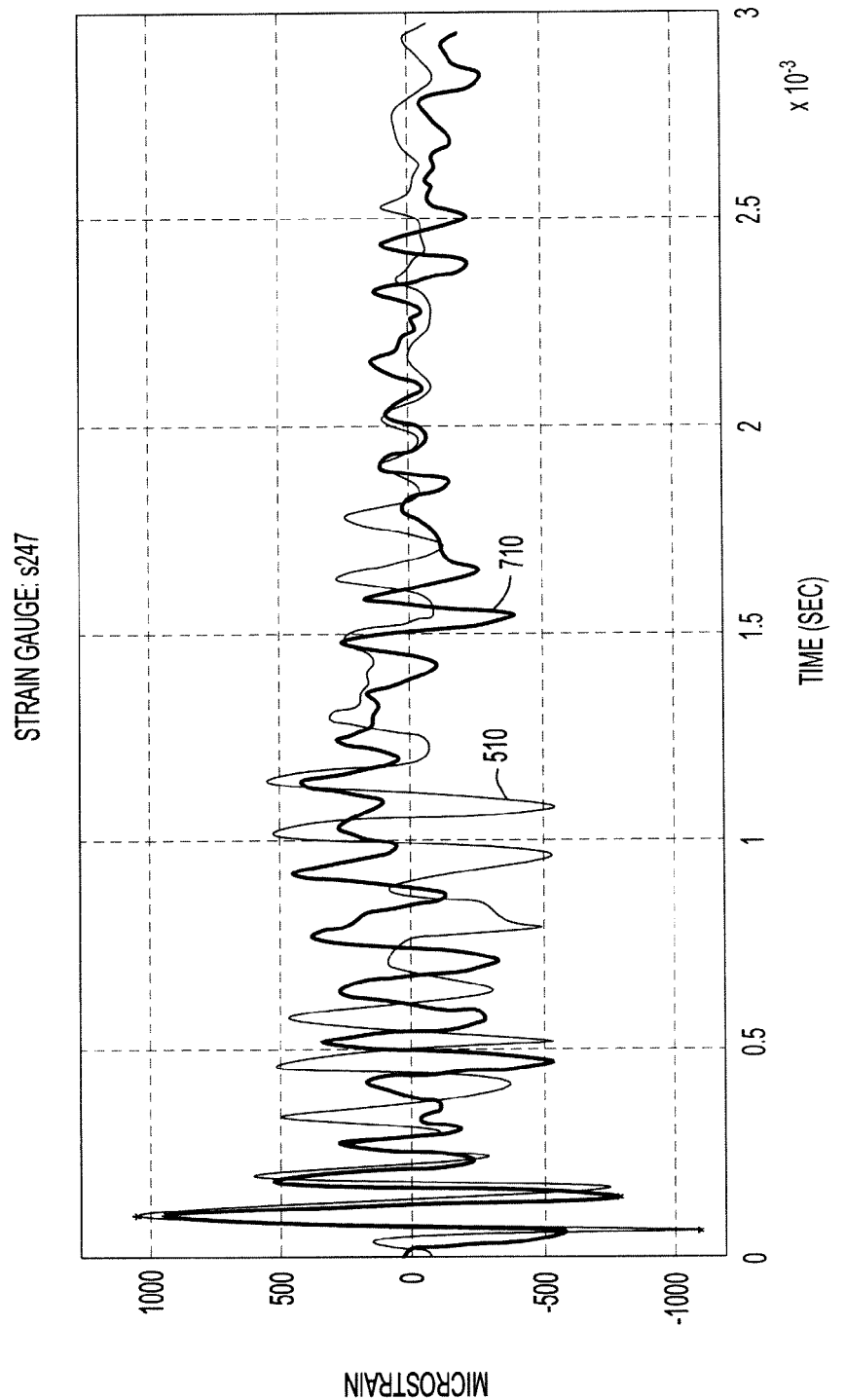
FIG. 7 is a graphical illustration of an example plot of microstrain against time for test data recorded from a strain gauge and simulation data generated from an updated computer model of the strain gauge.

Improvements to the simulation may be made over time, where the spider plots indicate the areas of the simulation digressing from the test data, while the correlations score indicates the "fit" of the simulation model. Two sets of data that may be used to generate correlation metrics are shown in FIG. 7. Test data 510 is the same test data that was shown in FIG. 5. The simulation data 710 were generated in year 2 from an updated simulation model (the mathematical model of the structure and strain gauge s247). Test data 510 and simulation data 710 are plotted as microstrain versus time.

Figure 8:
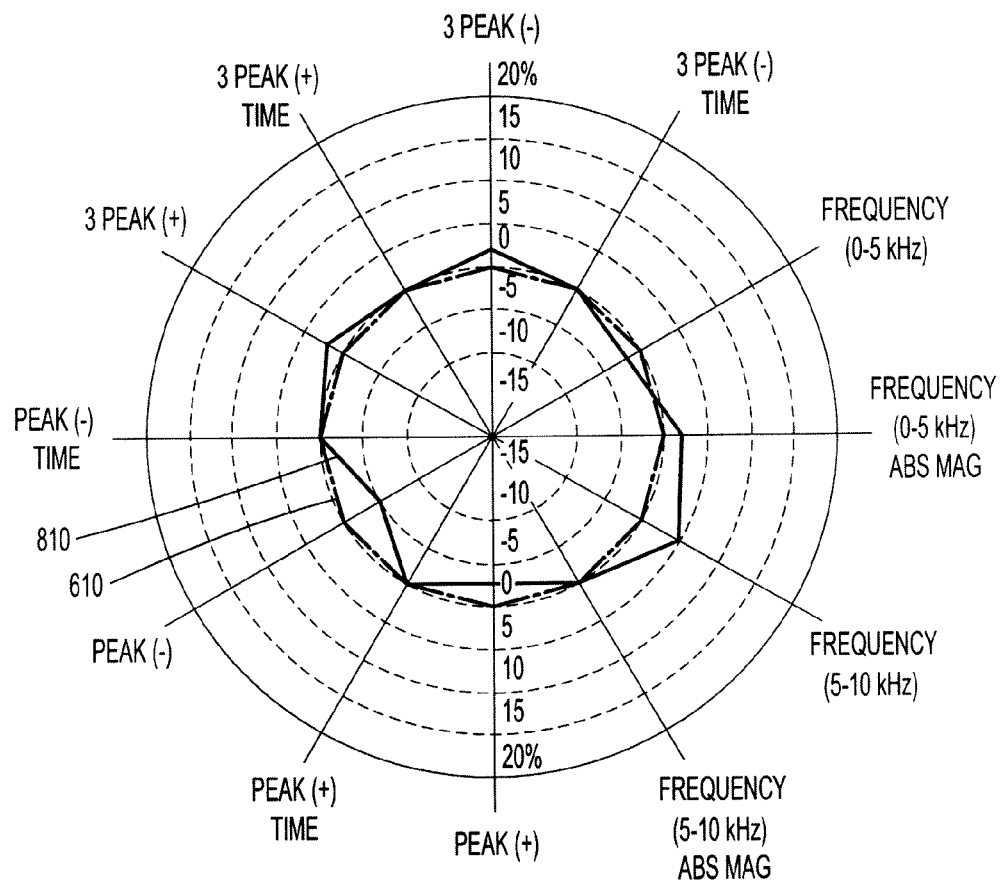
FIG. 8 is a graphical illustration of a radial plot of a plurality of correlation metrics that are generated in accordance with an embodiment of the present invention for the test data and updated simulation data illustrated in FIG. 7.

Correlation metrics were generated from both sets of data 510 and 710. A spider plot of the correlation metrics generated in year 2 is shown in FIG. 8. The correlation metrics for the test data 510 are plotted as the baseline ring 610 as in FIG. 6. Simulation correlation metrics 810 are plotted relative to the baseline 610. The types of correlation metrics shown in FIG. 8 are the same as those described in connection with FIG. 6. The correlation score for the correlation metrics generated in year 2 is 20.4154. This correlation score is lower than the correlation score generated in year 1 and indicates that simulation model has improved since year 1.

Figure 9:
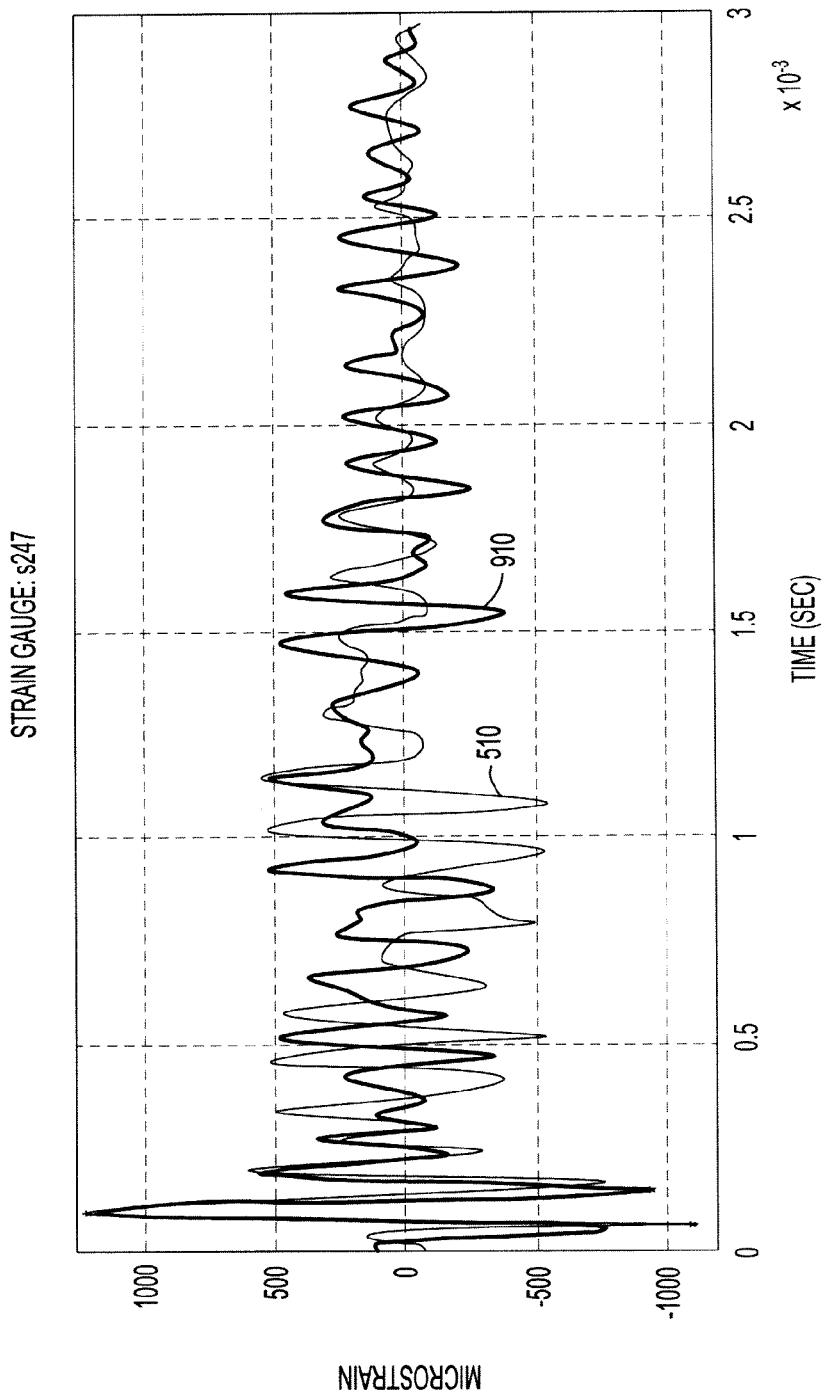
FIG. 9 is a graphical illustration of an example plot of microstrain against time for test data recorded from a strain gauge and simulation data generated from a further updated computer model of the strain gauge.

Still further improvements to the simulation may be made based on the spider plot. Two sets of data that may be used to generate correlation metrics are shown in FIG. 9. Test data 510 is the same test data that was shown in FIGS. 5 and 7. The simulation data 910 were generated in year 3 from a further updated simulation model. Test data 510 and simulation data 910 are plotted as microstrain versus time.

Figure 10:
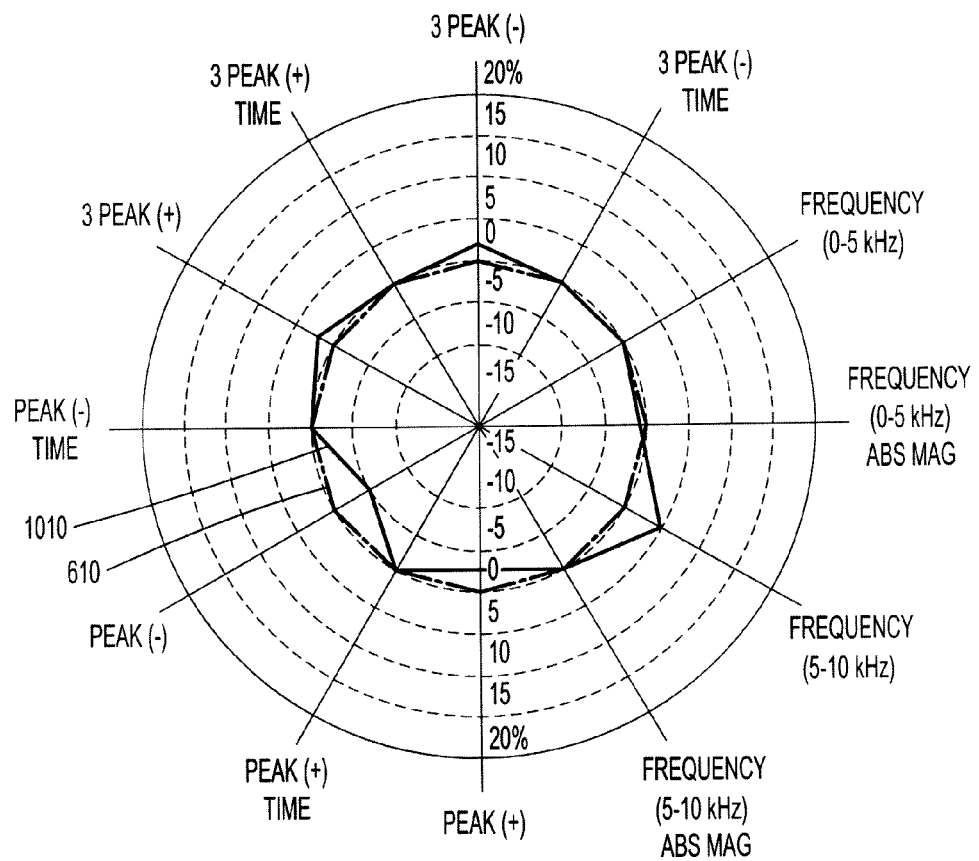
FIG. 10 is a graphical illustration of a radial plot of a plurality of correlation metrics that are generated in accordance with an embodiment of the present invention for the test data and the further updated simulation data illustrated in FIG. 9.

Correlation metrics were generated from both sets of data 510 and 910. A spider plot of the correlation metrics generated in year 3 is shown in FIG. 10. The correlation metrics for the test data 510 are plotted as the baseline ring 610 as in FIGS. 6 and 8. Simulation correlation metrics 1010 are plotted relative to the baseline 610. The types of correlation metrics shown in FIG. 10 are the same as those described in connection with FIG. 6. The correlation score for the correlation metrics generated in year 3 is 15.1404. This correlation score is lower than the correlation score generated in year 2 and indicates that simulation model has improved since year 2.

Figure 11:
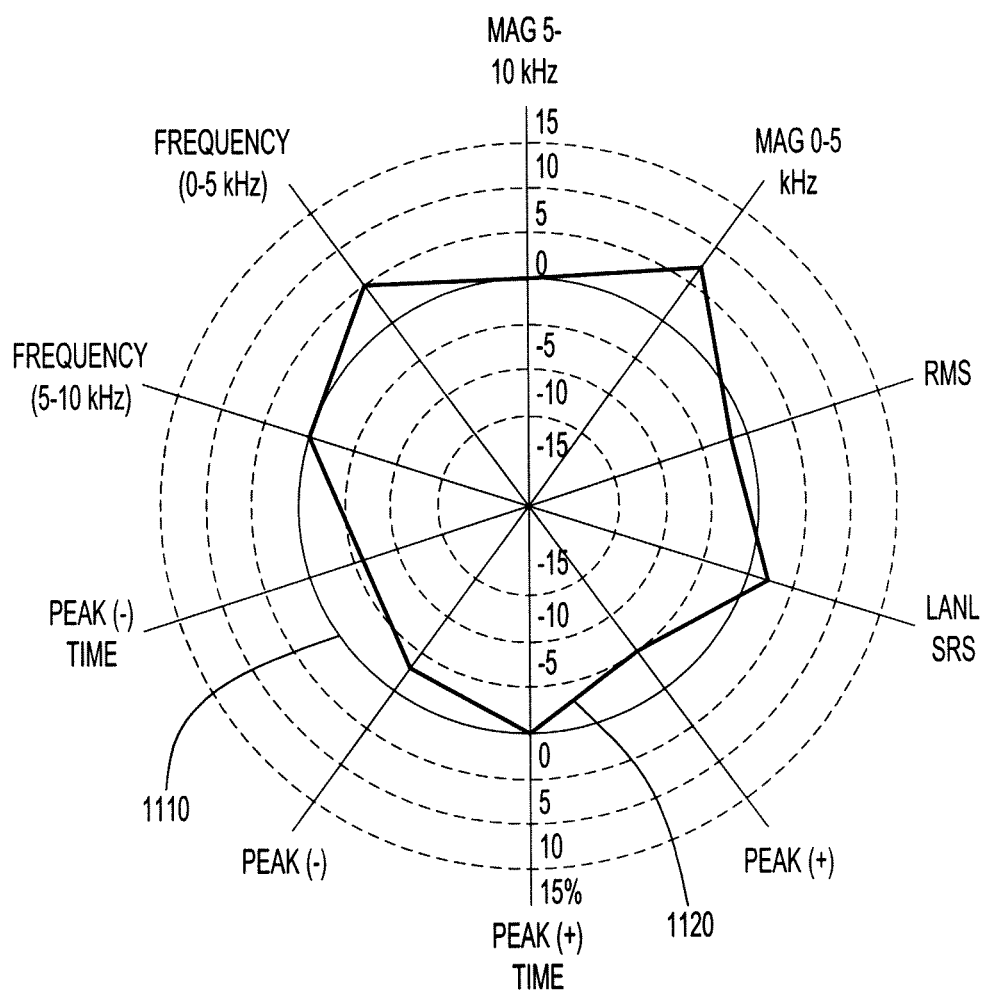
FIG. 11 is a graphical illustration of a radial plot of a plurality of correlation metrics that are generated in accordance with an embodiment of the present invention for test data and simulation data derived for an accelerometer.

In another example, accelerometers may be attached to the structure in addition to or in lieu of the strain gauges. After a force is applied to the structure, the accelerations from the accelerometer are recorded. Simulation data are derived from a mathematical model of the structure and the accelerometer. Correlation metrics were generated from the recorded accelerometer data and the simulation data. A spider plot of the correlation metrics is shown in FIG. 11. The correlation metrics for the acceleration test data are plotted as the baseline ring 1110. Simulation correlation metrics 1120 are plotted relative to the baseline ring 1110. Starting with the Peak (+) Metric and preceding clockwise, each of the correlation metrics shown in FIG. 11 will now be described.

The Peak (+/−) Metrics, Peak (+/−) Time Metrics, Frequency (0-5/5-10 kHz), and Frequency (0-5/5-10 kHz) Absolute Magnitude Metrics operate essentially as described above. In this example, the 3 Peak Metrics are not used and two new metrics have been added that are more germane to modeling accelerometer simulations. The new metrics are RMS error between the test data and simulation data and the Los Alamos National Laboratory (LANL) Shock Response Spectrum (SRS).

The RMS metric is the percent error between the RMS value of the FEA results and the RMS value of the test data divided by the RMS value of the test data. For purposes of calculating the correlation score, the RMS Error metric is given a weight of 17.5% as shown in Eq. 14. The RMS(FEA) used in Eq. 14 is calculated according to Eq. 15.

$$\text{RMS Error} = (17.5\%) \times \left[ \frac{\text{RMS}(FEA) - \text{RMS}(\text{Test})}{\text{RMS}(\text{Test})} \right] \qquad \text{(Eq. 14)}$$

$$\text{RMS}(FEA) = \sqrt{\frac{FEA_1^2 + FEA_2^2 + \ldots + FEA_n^2}{n}} \qquad \text{(Eq. 15)}$$

The LANL SRS metric is the percent error between the FEA results and the test data using the $\text{SRS}_{Factor}$, where the $\text{SRS}_{Factor}$ is the average difference between computer simulation results and test data for each peak response comprising the SRS. The use of common logarithms in the $\text{SRS}_{Factor}$ calculation ensures positive integer values. For purposes of calculating the correlation score, the LANL SRS Metric is given a weight of 17.5% as shown in Eq. 16. The SRS is a plot of the maximum peak response corresponding to a specific forcing function to a single degree-of-freedom (SDOF) system as a function of the natural frequency of the system. Numerical analysis is used to compute the peak response of the SDOF for the specific forcing function. In this example, the forcing function input is acceleration data recorded during testing or predicted by the computer model. Eqs. 17 and 18 provide an example calculation of the $\text{SRS}_{Factor}$ used in Eq. 16.

$$\text{LANL SRS} = (17.5\%) \times [\text{SRS}_{FACTOR} - 1] \qquad \text{(Eq. 16)}$$

$$\text{SRS}_{FACTOR} = \text{average}(10^{|\Delta_{SRS}|}) \qquad \text{(Eq. 17)}$$

$$\Delta_{SRS} = \log_{10} FEA_{SRS} = \log_{10} \text{Test}_{SRS} \qquad \text{(Eq. 18)}$$

It will be appreciated that the embodiments described above and illustrated in the drawings represent only a few of the many ways of implementing a method and apparatus for correlating simulation models with physical devices based on correlation metrics.

The functions of the general purpose computer employed by the present invention embodiments may be implemented and/or performed by any quantity of any personal or other type of computer system (e.g., IBM-compatible, Apple, Macintosh, laptop, rack or cluster systems, palm pilot, etc.) or processing device (e.g., microprocessor, controller, circuitry, etc.), and may include any commercially available operating system (e.g., Windows, OS/2, Unix, Linux, etc.) and any commercially available or custom software (e.g., browser software, communications software, server software). These systems may include any types of monitors and input devices (e.g., keyboard, mouse, touch screens, etc.) to enter and/or view information.

Databases for storing test and simulation data may be implemented by any quantity of any type of conventional or other databases (e.g., relational, hierarchical, etc.) or storage structures (e.g., files, data structures, disk or other storage, etc.). The databases may store any desired information arranged in any fashion (e.g., tables, relations, hierarchy, etc.). The databases may be queried with any quantity or type, and request any type of database or other operation. The queries may include any desired format and may be directed toward any conventional or other database or storage unit.

The correlation metrics may be of any type or quantity. The correlation metrics may be grouped or combined in any manner and generated any number of times, e.g., using Monte Carlo simulation. The correlation score may be computed in any manner suitable for indicating a similarity of operation between two or more systems. The systems may be of any type or quantity, and represent real-world systems, simulations of real-world systems, or both. Mathematical operations performed on the underlying data, the correlation metrics, and the correlation score may be of any type including matrix operations, quantization, normalization, etc., to produce an indication of similarity of operation between two or more systems. The display of the correlation metrics and score may be radial plots, spider plots, nested plots (with drill-down options via a GUI), or any visual representation for presenting a plurality of metrics and the associated correlation score.

It is to be understood that the software (e.g., the correlation module or logic) for the computer systems and/or processing devices of the present invention embodiments (e.g., the general purpose computers) may be implemented in any desired computer language (e.g., ADA, C, C++, C#, Java, etc.) and could be developed by one of ordinary skill in the computer arts based on the functional descriptions contained in the specification and flow charts illustrated in the drawings. The software is extensible and may be an add-on module to various simulation packages, e.g., Ansys FLUENT®, Abaqus®, Simulation Environment and Response Program Execution Nesting Tool (SERPENT), Aeroheating and Thermal Analysis Code (ATAC), etc. Further, any references herein of software performing various functions generally refer to computer systems or processors performing those functions under software control.

Furthermore, the software of the present invention embodiments may be available on a recordable medium (e.g., magnetic or optical mediums, magneto-optic mediums, floppy diskettes, CD-ROM, DVD, memory devices, etc.) for use on stand-alone systems or systems connected by a network or other communications medium, and/or may be downloaded (e.g., in the form of carrier waves, packets, etc.) to systems via a network or other communications medium.

The computer systems and/or processing devices of the present invention embodiments may alternatively be implemented by any type of hardware and/or other processing circuitry. The functions of the computer systems and/or processing devices may be implemented by logic encoded in one or more tangible media (e.g., embedded logic such as an application specific integrated circuit (ASIC), digital signal processor (DSP) instructions, software that is executed by a processor, etc.). Thus, functions of the computer systems and/or processing devices may be implemented with fixed logic or programmable logic (e.g., software/computer instructions executed by a processor) by way of a programmable processor, programmable digital logic (e.g., field programmable gate array (FPGA)) or an ASIC that comprises fixed digital logic, or a combination thereof.

The various functions of the computer systems and/or processing devices of the present invention embodiments may be distributed in any manner among any quantity of software and hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among several computer systems (e.g., test data may be processed on one computer, simulation data on a second computer, while correlation metrics may be generated on a third computer). The software and/or algorithms described above and illustrated in the flow charts may be modified in any manner that accomplishes the functions described herein. In addition, the functions in the flow charts or description may be performed in any order that accomplishes a desired operation.

The computer systems of the present invention embodiments may include any conventional or other communications devices to communicate over the networks via any conventional or other protocols. The computer may utilize any type of connection (e.g., wired, wireless, etc.) for access to the network. The communication over the communication networks may be implemented by any quantity of any type of communications protocol (e.g., TCP/IP, SONET, MAC, ATM, IP/Ethernet over WDM, etc.) operable within or outside the OSI model.

It is to be understood that the present invention embodiments are not limited to the applications disclosed herein, but may be utilized for any device or system that is to be modeled. Further, the present invention embodiments may be used to generate metrics in real-time and may be implemented using a real-time operating system. Such systems may include earthquake or weather modeling in which test data are environmentally collected in real-time. In one example, weather simulation may be run concurrently with real-time weather data collection. Near real-time correlation metrics may be generated for the simulation. The real-time correlation metrics may be fed back into the simulation such that an adaptive simulation model may be improved. The correlation metrics and score may be watched in real-time, e.g., by updating the spider plots and scores at a predetermined rate.

From the foregoing description, it will be appreciated that the invention makes available a novel method and apparatus for correlating simulation models with physical devices or physical systems based on correlation metrics.

Having described preferred embodiments of a new and improved method and apparatus for correlating simulation models with physical devices or physical systems based on correlation metrics, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:
1. An apparatus to correlate operation of first and second systems comprising:
   an output module coupled to a display to present a plurality of correlation metrics and a correlation score for said first and second systems; and a processor to control said presentation of said plurality of correlation metrics and said correlation score, wherein said processor includes a correlation module to:
generate a first set of metrics for a first set of data produced during operation of said first system, wherein said first system includes a real-world system;
generate a second set of metrics that correspond to each of said first set of metrics from a second set of data produced during operation of said second system configured to simulate said first system, wherein said second system comprises one of a physical system and a simulation system;
compute a correlation score for said first and second systems indicating a similarity of operation based on differences between said first set of metrics and said second set of metrics;
present said first set of metrics, said second set of metrics, and said correlation score on said display via said output module to indicate said similarity of operation, wherein said first set of metrics is presented as a first plot comprising an axis for each metric, and wherein said second set of metrics is presented as a second plot wherein each metric in said second set of metrics is presented relative to a corresponding metric in said first plot, wherein said first and second sets of metrics compare simulation data from said second system with actual test data from said first system to determine how well said second system models the real-world system; and
updating operation of said second system based on said correlation score and differences in said presented metrics in order to improve similarity of operation to said first system by said second system.

2. The apparatus of claim 1, wherein said correlation module is configured to normalize said second set of metrics with respect to said first set of metrics such that said first set of metrics forms a baseline.

3. The apparatus of claim 2, wherein said normalized second set of metrics is presented on said display relative to said baseline.

4. The apparatus of claim 3, wherein said baseline is presented as a first radial plot, and said normalized second set of metrics is presented as a second radial plot.

5. The apparatus of claim 4, wherein said first radial plot comprises a scale to indicate the relative differences between said second set of metrics and said first set of metrics.

6. The apparatus of claim 2, wherein said correlation score is computed based on differences between said normalized second set of metrics and said baseline.

7. The apparatus of claim 2, wherein said correlation score is computed based on weighted differences between said normalized second set of metrics and said baseline.

8. The apparatus of claim 1, wherein said metrics within said first and second sets are weighted.

9. The system of claim 1, wherein the correlation module further aligns a time of the first data set and a time of the second data set.

10. The apparatus of claim 1, wherein said plot of said first and second sets of metrics indicate an area for improvement of said simulation of said first system by said second system, and wherein updating comprises updating said simulation of said first system by said second system based on said area for improvement to reduce said differences between said first set of metrics and said second set of metrics.

11. A method to correlate operation of first and second systems comprising:
generating a first set of metrics for a first set of data produced during operation of said first system, wherein said first system includes a real-world system;
generating a second set of metrics that correspond to each of said first set of metrics from a second set of data produced during operation of said second system configured to simulate said first system, wherein said second system comprises one of a physical system and a simulation system;
computing a correlation score for said first and second systems indicating a similarity of operation based on differences between said first set of metrics and said second set of metrics;
presenting said first set of metrics, said second set of metrics, and said correlation score on a display to indicate said similarity of operation;
wherein said first set of metrics is presented as a first plot comprising an axis for each metric, and wherein said second set of metrics is presented as a second plot wherein each metric in said second set of metrics is presented relative to a corresponding metric in said first plot, wherein said first and second sets of metrics compare simulation data from said second system with actual test data from said first system to determine how well said second system models the real-world system; and
updating operation of said second system based on said correlation score and differences in said presented metrics in order to improve similarity of operation to said first system by said second system.

12. The method of claim 11, further comprising normalizing said second set of metrics with respect to said first set of metrics such that said first set of metrics forms a baseline.

13. The method of claim 12, wherein presenting comprises presenting said normalized second set of metrics on said display relative to said baseline.

14. The method of claim 13, wherein presenting comprises presenting said baseline as a first radial plot, and said normalized second set of metrics is presented as a second radial plot.

15. The method of claim 14, wherein presenting comprises presenting said first radial plot with a scale to indicate the relative differences between said second set of metrics and said first set of metrics.

16. The method of claim 12, wherein computing comprises computing said correlation score based on differences between said normalized second set of metrics and said baseline.

17. The method of claim 12, wherein computing comprises computing said correlation score based on weighted differences between said normalized second set of metrics and said baseline.

18. The method of claim 11, further comprising weighting said metrics within said first and second sets of metrics.

19. The method of claim 11, wherein computing the correlation score comprises aligning a time of the first data set and a time of the second data set.

20. The method of claim 11, wherein said plot of said first and second sets of metrics indicate an area for improvement of said simulation of said first system by said second system, and wherein updating comprises updating said simulation of said first system by said second system based on said area for improvement to reduce said differences between said first set of metrics and said second set of metrics.

21. A non-transitory computer-readable medium encoded with computer program logic to correlate operation of first and second systems, said computer program logic comprising instructions, that when executed by a processor, cause the processor to:

generate a first set of metrics for a first set of data produced during operation of said first system, wherein said first system includes a real-world system;

generate a second set of metrics that correspond to each of said first set of metrics from a second set of data produced during operation of said second system configured to simulate said first system, wherein said second system comprises one of a physical system and a simulation system;

compute a correlation score for said first and second systems indicating a similarity of operation based on differences between said first set of metrics and said second set of metrics;

present said first set of metrics, said second set of metrics, and said correlation score on a display to indicate said similarity of operation, wherein said first set of metrics is presented as a first plot comprising an axis for each metric, and wherein said second set of metrics is presented as a second plot wherein each metric in said second set of metrics is presented relative to a corresponding metric in said first plot, wherein said first and second sets of metrics compare simulation data from said second system with actual test data from said first system to determine how well said second system models the real-world system; and update operation of said second system based on said correlation score and differences in said presented metrics in order to improve similarity of operation to said first system by said second system.

22. The non-transitory computer-readable medium of claim 21, further comprising instructions to normalize said second set of metrics with respect to said first set of metrics such that said first set of metrics forms a baseline.

23. The non-transitory computer-readable medium of claim 22, wherein said instructions that present comprise instructions to present said normalized second set of metrics on said display relative to said baseline.

24. The non-transitory computer-readable medium of claim 23, wherein said instructions that present comprise instructions to present said baseline as a first radial plot, and said normalized second set of metrics is presented as a second radial plot.

25. The non-transitory computer-readable medium of claim 24, wherein said instructions that present comprise instructions to present said first radial plot with a scale to indicate the relative differences between said second set of metrics and said first set of metrics.

26. The non-transitory computer-readable medium of claim 22, wherein said instructions that compute comprise instructions to compute said correlation score based on differences between said normalized second set of metrics and said baseline.

27. The non-transitory computer-readable medium of claim 22, wherein said instructions that compute comprise instructions to compute said correlation score based on weighted differences between said normalized second set of metrics and said baseline.

28. The non-transitory computer-readable medium of claim 21, further comprising instructions to weight said metrics within said first and second sets of metrics.

29. The non-transitory computer-readable medium of claim 21, wherein said instructions that compute the correlation score comprise instructions to align a time of the first data set and a time of the second data set.

30. The non-transitory computer-readable medium of claim 21, wherein said plot of said first and second sets of metrics indicate an area for improvement of said simulation of said first system by said second system, and wherein said instructions that update comprise instructions to update said simulation of said first system by said second system based on said area for improvement to reduce said differences between said first set of metrics and said second set of metrics.

* * * * *